(12) United States Patent  (10) Patent No.: US 8,407,794 B2
Kim et al.  (45) Date of Patent: Mar. 26, 2013

(54) SIGNATURE SEARCHING METHOD AND APPARATUS USING SIGNATURE LOCATION IN PACKET

(75) Inventors: Seung-Kyeom Kim, Daejeon-si (KR); Ho-Sug Lee, Hwaseong-si (KR); Myeong-Seok Kim, Daejeon-si (KR)

(73) Assignee: Sysmate Co., Ltd., Daejeon-si (KR)

( * ) Notice: Subject to any disclaimer, the term of this patent is extended or adjusted under 35 U.S.C. 154(b) by 294 days.

(21) Appl. No.: 12/763,832

(22) Filed: Apr. 20, 2010

(65) Prior Publication Data

US 2010/0275261 A1  Oct. 28, 2010

(30) Foreign Application Priority Data

Apr. 22, 2009  (KR) .................. 10-2009-0035180

(51) Int. Cl.
*G06F 11/00* (2006.01)
*G06F 12/14* (2006.01)
*G06F 12/16* (2006.01)
*G06F 11/30* (2006.01)
*G06F 15/02* (2006.01)
*G06F 13/00* (2006.01)
*G06F 13/28* (2006.01)
*G08B 23/00* (2006.01)
*G06F 15/173* (2006.01)

(52) U.S. Cl. .......... 726/24; 713/188; 709/224; 708/212; 711/108

(58) Field of Classification Search .............. 726/22–25; 709/224; 713/160, 162, 188; 708/212; 711/108
See application file for complete search history.

(56) References Cited

U.S. PATENT DOCUMENTS

| | | | | |
|---|---|---|---|---|
| 5,841,874 | A * | 11/1998 | Kempke et al. ................ | 713/160 |
| 7,444,515 | B2 * | 10/2008 | Dharmapurikar et al. .... | 713/176 |
| 7,454,418 | B1 * | 11/2008 | Wang .................................. | 1/1 |
| 7,549,158 | B2 * | 6/2009 | Shelest et al. ..................... | 726/1 |
| 7,613,669 | B2 * | 11/2009 | Shin et al. ........................ | 706/46 |
| 7,613,755 | B1 * | 11/2009 | Venkatachary ................ | 708/212 |
| 7,802,303 | B1 * | 9/2010 | Zhao et al. ........................ | 726/24 |
| 7,870,161 | B2 * | 1/2011 | Wang ............................. | 707/801 |
| 7,933,282 | B1 * | 4/2011 | Gupta et al. ................... | 370/412 |
| 8,131,841 | B2 * | 3/2012 | Eswaran et al. .............. | 709/224 |
| 2003/0154399 | A1* | 8/2003 | Zuk et al. ....................... | 713/201 |
| 2004/0109451 | A1* | 6/2004 | Huang et al. ................... | 370/392 |
| 2004/0111395 | A1* | 6/2004 | Rajgopal et al. ................. | 707/3 |
| 2005/0216770 | A1* | 9/2005 | Rowett et al. .................. | 713/201 |
| 2006/0167843 | A1* | 7/2006 | Allwright et al. .................. | 707/3 |
| 2006/0174107 | A1* | 8/2006 | Furlong et al. ................ | 713/160 |
| 2006/0259966 | A1* | 11/2006 | Ilnicki ............................ | 726/22 |
| 2007/0280106 | A1* | 12/2007 | Lund .............................. | 370/230 |
| 2007/0283440 | A1* | 12/2007 | Yao et al. ........................ | 726/24 |

(Continued)

FOREIGN PATENT DOCUMENTS

KR  10-0651743  11/2006

*Primary Examiner* — Christian Laforgia
(74) *Attorney, Agent, or Firm* — NSIP Law

(57) ABSTRACT

A method of and apparatus for searching for a signature in a packet according to a signature location. The method may include extracting a sub-payload to be compared with a signature from a payload of a packet, generating an offset that is location information about a location of the sub-payload in the payload, generating a search key that includes the extracted sub-payload and the generated offset, and performing ternary content addressable memory (TCAM) matching to check if the generated search key matches a TCAM entry.

9 Claims, 12 Drawing Sheets

U.S. PATENT DOCUMENTS

| | | | |
|---|---|---|---|
| 2008/0034433 A1* | 2/2008 | Kim et al. | 726/23 |
| 2008/0050469 A1 | 2/2008 | Kwon et al. | |
| 2008/0111716 A1* | 5/2008 | Artan et al. | 341/50 |
| 2008/0133583 A1* | 6/2008 | Artan et al. | 707/102 |
| 2009/0030895 A1* | 1/2009 | Eswaran et al. | 707/5 |
| 2009/0135826 A1* | 5/2009 | Kim et al. | 370/392 |
| 2010/0138599 A1* | 6/2010 | Kim et al. | 711/108 |
| 2010/0194608 A1* | 8/2010 | Artan et al. | 341/51 |
| 2010/0251364 A1* | 9/2010 | Lee et al. | 726/22 |
| 2011/0055130 A1* | 3/2011 | Kim et al. | 706/18 |

* cited by examiner

| offset | signature |

FIG. 4

SIGNATURE SEARCHING METHOD AND APPARATUS USING SIGNATURE LOCATION
IN PACKET

CROSS-REFERENCE TO RELATED APPLICATION

This application claims the benefit under 35 U.S.C. §119(a) of Korean Patent Application No. 10-2009-0035180, filed on Apr. 22, 2009, the entire disclosure of which is incorporated herein by reference for all purposes.

BACKGROUND

1. Field

The following description relates to a network device, more particularly, to a method of searching for a signature in a payload of a packet received through a network line.

2. Description of the Related Art

Recently, following the ever increasing distribution of high-speed internet networks, the need for improved performance of security device performances is increasing. Conventional network devices detect intrusion and filter packets using specific signature matching in a packet. Such detection and filtering functions of the network devices can be implemented in a hardware manner, in a software manner, or in a combined hardware and software manner. In addition, a variety of requirements for signature matching increases as the network speed becomes faster and invasion methods become more and more diverse. In particular, high-speed signature matching technologies and signature matching technologies using a specific location and a specific range in a packet are increasingly required, and thus research on various methods that can satisfy such requirements has been conducted.

In a high-speed packet processing system such as a firewall and an intrusion detection system, a hardware-based technology such as a ternary content addressable memory (TCAM) is used to detect a match of a packet with a security policy at high speed. TCAM is used for high-speed signature searching in a payload of a packet. The high-speed signature matching is implemented by setting a signature in a TCAM and matching a header and the payload of the packet. Based on the signature matching result, a signature range searching process is performed in hardware and software manners to determine whether the matched signature is located on a specific position in the packet or within a specific range in the packet. Due to the signature range searching process after the TCAM matching, it takes a substantial amount of time for this process, thus impeding high-speed performance of a network device.

SUMMARY

The following description relates to a high-speed signature searching method which can process a signature search and a signature range search as a single operation, thereby reducing a signature searching time.

In one general aspect, provided is a method of searching for a signature in a packet. The method includes extracting a sub-payload to be compared with a signature from a payload of a packet, generating an offset that is location information about a location of the sub-payload in the payload, generating a search key that includes the extracted sub-payload and the generated offset, and performing ternary content addressable memory (TCAM) matching to check if the generated search key matches a TCAM entry.

The TCAM entry may include a signature and an offset that is location information about a location of the signature in the payload. The offset may comprise a first bit group and at least one second bit group located behind the first bit group, the first bit group comprising a plurality of bits that correspond sequentially to sections of the payload, the sections being set by dividing the payload by a predetermined length, and the second bit group comprising a plurality of bits that correspond sequentially to subsections of each section corresponding to each bit of the first bit group, the subsections being set by dividing each section by a predetermined length smaller than the length used for dividing the section. The generating of the offset may set one bit belonging to each of the first bit group and the at least one second bit group as a valid bit. In response to the signature being to be matched on a designated offset location, one bit included in each of the first bit group and the second bit group of the offset included in the TCAM entry may be set as a valid bit. In response to the signature being to be matched on a location behind or ahead of a designated offset, at least one of the bits belonging to the offset included in the TCAM entry may be set as "Don't Care" bits.

In another general aspect, there is provided an apparatus for searching for a signature in a packet, the apparatus comprising: an extractor configured to extract a sub-payload to be compared with a signature from a payload of a packet; an offset generator configured to generate an offset that is location information about a location of the sub-payload in the payload; a search key generator configured to generate a search key that comprises the extracted sub-payload and the generated offset; and a performer configured to perform ternary content addressable memory (TCAM) matching to check if the generated search key matches a TCAM entry.

Other features and aspects will be apparent from the following detailed description, the drawings, and the claims.

BRIEF DESCRIPTION OF THE DRAWINGS

FIG. 4 is a diagram illustrating an example configuration of a ternary content addressable memory (TCAM) entry.

Figure 1:
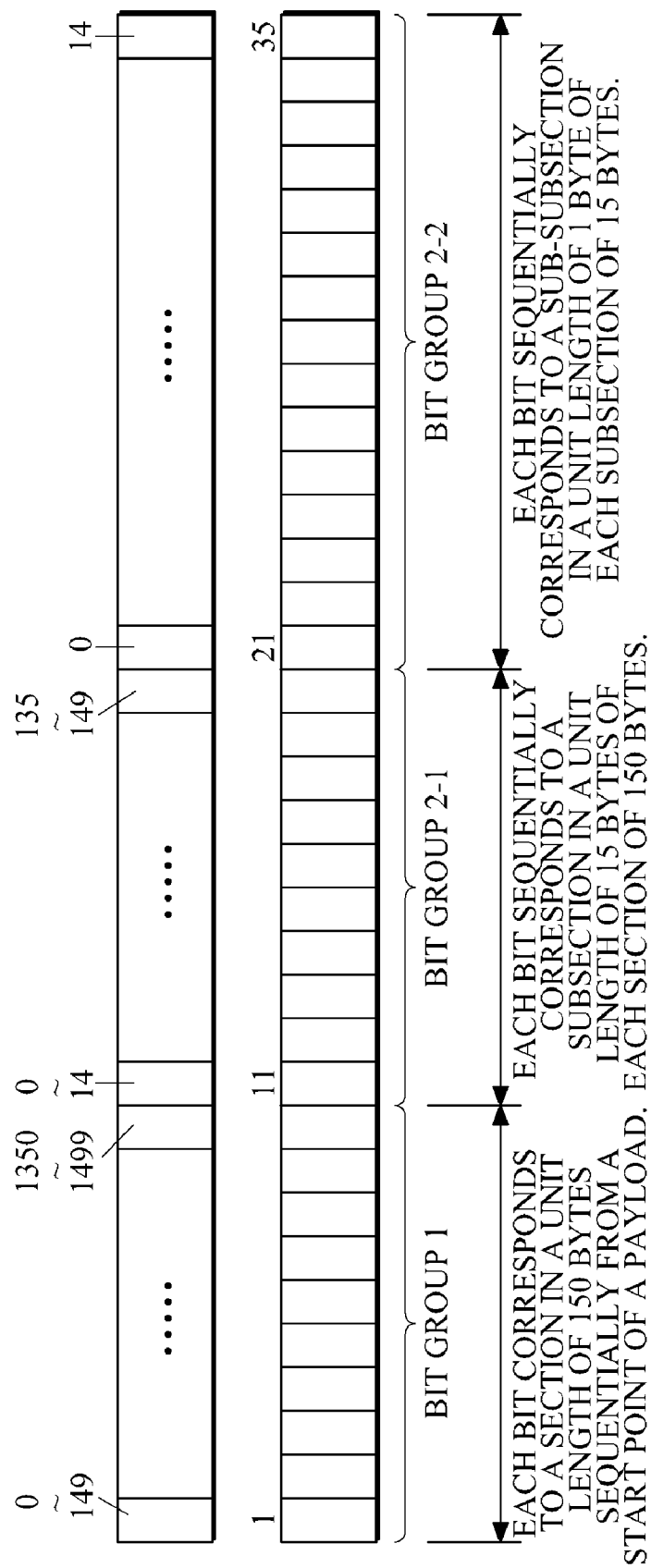
FIG. 1 is a diagram illustrating an example configuration of an offset.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Terms to be used hereinafter are defined as below.

Payload: original data as reference for determining the existence of a signature Signature: data as a target for matching, which is set in a ternary content addressable memory (TCAM) entry Sub-payload: data to be compared with a signature, and extracted from a payload corresponding to a size of the signature Offset: information of location of a signature in a payload of a packet, which is set in a TCAM entry Search key: combination of the sub-payload extracted from the payload and the offset, which is used as data for signature search FIG. 1 illustrates an example of a diagram for explaining an offset. Referring to FIG. 1, an offset is information of location of a signature in a payload and is additionally set in a TCAM entry for efficient signature search. For example, where a payload is 1500 bytes in length, an offset set in each of a TCAM entry and a search key may be 35 bits in length as illustrated in FIG. 1.

The offset illustrated in FIG. 1 is a bit sequence including a bit group 1 and a bit group 2. The bit group 2 includes a bit group 2-1 and a bit group 2-2. The bit group 1 includes a first bit to a tenth bit, the bit group 2-1 includes an eleventh bit to a twentieth bit, and the bit group 2-2 includes a twenty first bit to a thirty fifth bit. The first to tenth bits of the bit group 1 correspond sequentially to sections of the payload where the sections are set by dividing the payload by 150 bytes. That is, each section consists of 150 bytes. Each bit of the first to tenth bits of the bit group 1 indicates whether a signature or a sub-payload is located in the corresponding section of the payload. The eleventh to twentieth bits of the bit group 2-1 correspond sequentially to subsections of each section corresponding to each bit of the bit group 1 where the subsections are set by dividing each section by 15 bytes. Thus, each subsection consists of 15 bytes. Each of the eleventh to twentieth bits of the bit group 2-1 indicates whether the signature or the sub-payload is located in the corresponding subsection. The twenty first to thirty fifth bits of the bit group 2-2 correspond sequentially to sub-subsections of each subsection corresponding to each bit of the bit group 2-1 where the sub-subsections are is set by dividing each subsection by 1 byte. Each bit of the twenty first to thirty fifth bits indicates whether the signature or the sub-payload is located in the corresponding sub-subsection. Although the offset shown in the example illustrated in FIG. 1 consists of three bit groups, the number of bit groups may vary according to the entire length of a payload.

Figure 2:
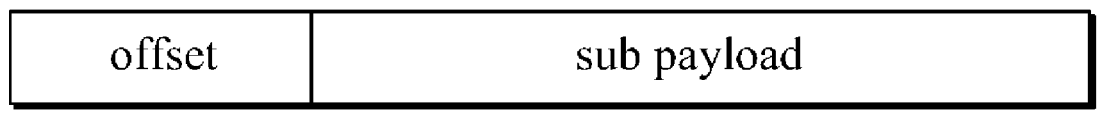
FIG. 2 is a diagram illustrating an example configuration of a search key.

FIG. 2 illustrates an example configuration of a search key. Referring to FIG. 2, the search key includes an offset and a sub-payload which is extracted from a payload to have the same size as a signature. The search key is data used for signature search in the process of TCAM matching. The offset provides information about the location of the sub-payload in a payload.

Figure 3:
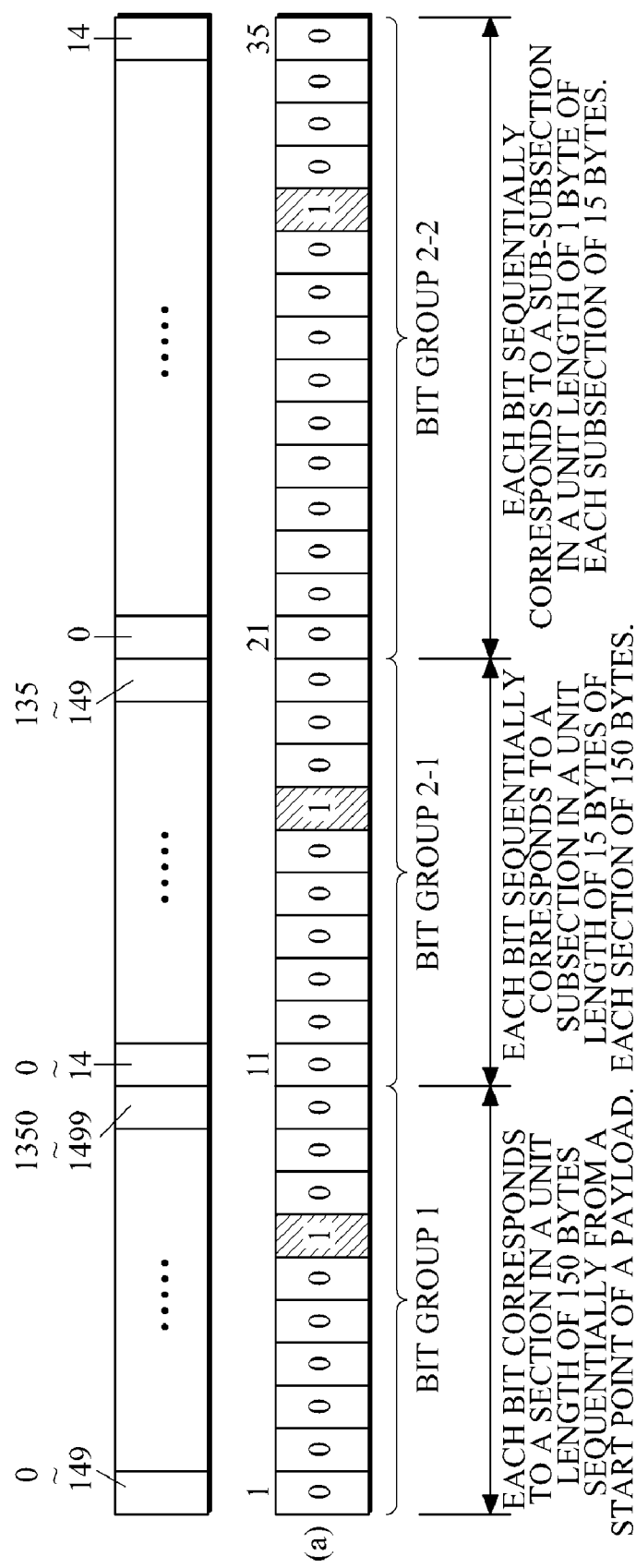
FIG. 3 is a diagram illustrating an example configuration of an offset for a sub-payload.

FIG. 3 illustrates an example configuration of an offset for a sub-payload. Referring to FIG. 3, in a case where a sub-payload is extracted at the $1000^{th}$ location of a payload, the offset may be set as shown in the example illustrated in FIG. 3. In a bit group 1, the seventh bit is set as a valid bit "1," and the rest of the bits are set as invalid bits "0." In a bit group 2-1, the seventh bit is set as a valid bit "1," and the rest of the bits are set as invalid bits "0." In a bit group 2-2, the eleventh bit is set as a valid bit "1," and the rest of the bits are set as invalid bits "0."

Figure 4:
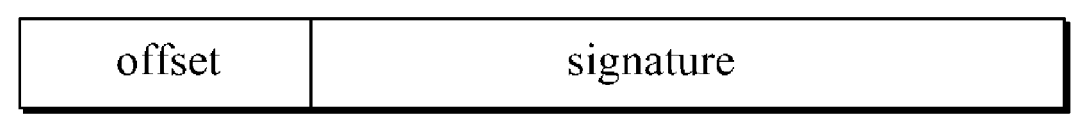

FIG. 4 illustrates an example configuration of a TCAM entry. Referring to FIG. 4, a TCAM entry consists of a signature and an offset. The offset is information about the location of the signature in a payload. The information may be set according to conditions as below.

Figure 5:
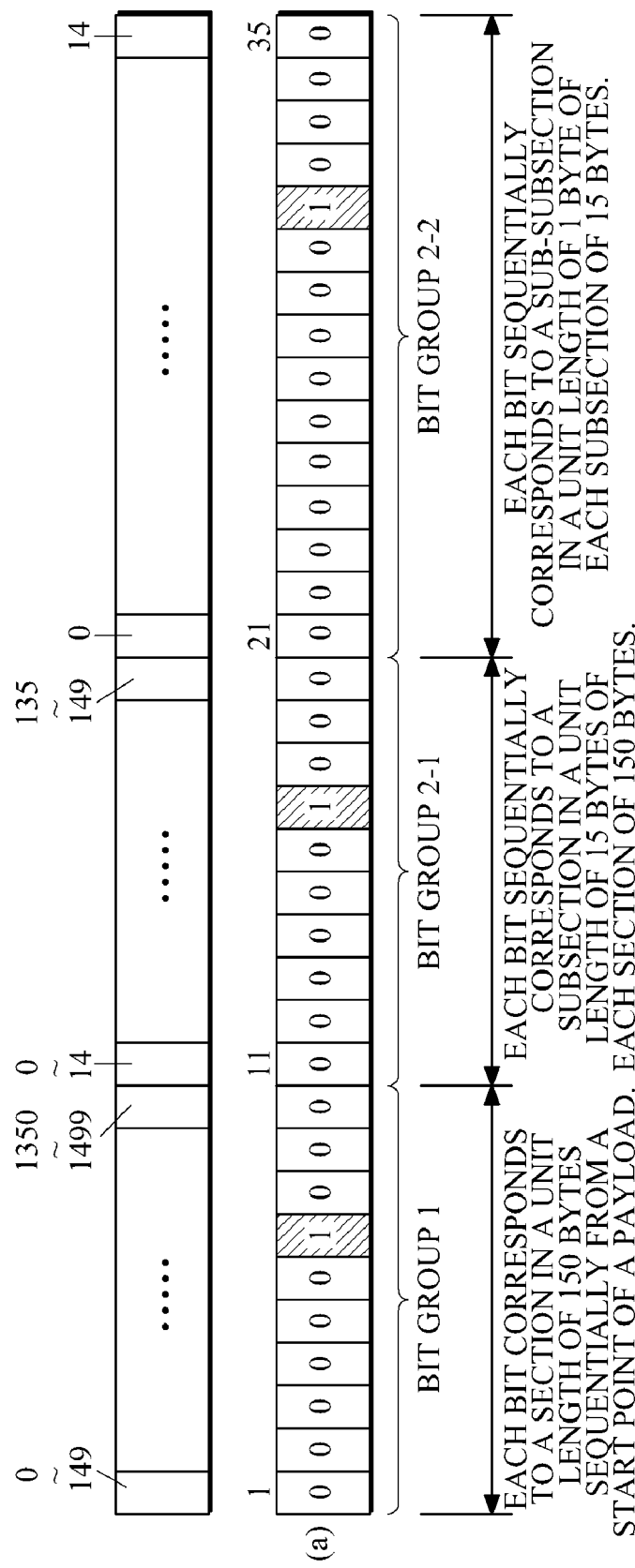
FIG. 5 is a diagram illustrating an example configuration of a TCAM entry when a signature is to be matched at a designated offset.

(1) A case where a signature is matched at a designated offset (2) A case where a signature is matched at a location behind a designated offset (3) A case where a signature is matched at a location ahead of a designated offset FIG. 5 illustrates an example configuration of a TCAM entry when a signature is to be matched at a designated offset. Referring to FIG. 5, an offset may be set to have one valid bit in each bit group when a signature is to be matched at a location of a designated offset, and it is possible to set one TCAM entry. For example, to match a signature at a location of an offset 1000 in a payload, the seventh bit in a bit group 1 is set as a valid bit, the seventh bit in a bit group 2-1 is set as a valid bit, and the eleventh bit in a bit group 2-2 is set as a valid bit as shown in FIG. 5.

If a signature is to be matched at a location behind a predetermined offset, between one and at most three offsets may be set in the TCAM entry according to an offset value.

Figure 6:
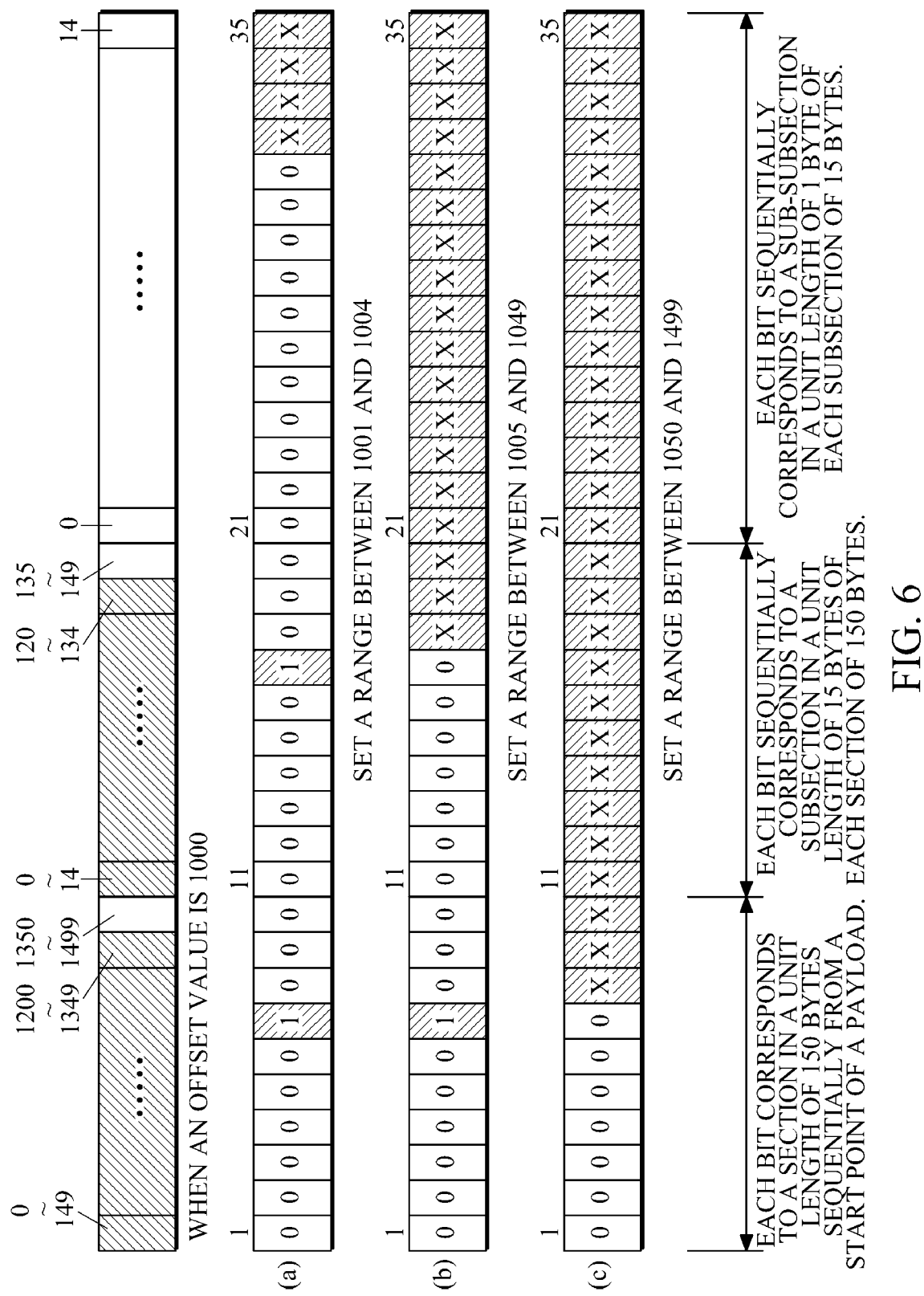
FIG. 6 is a diagram illustrating an example configuration of a TCAM entry when a signature is to be matched at a location behind a designated offset.

FIG. 6 illustrates an example configuration of a TCAM entry when a signature is to be matched at a location behind a designated offset. Referring to FIG. 6, when an offset value is located within the sections corresponding to the first to the ninth bits and within the subsections corresponding to the eleventh to the nineteenth bits, three TCAM entries are set. For example, if an offset value is 1000, three offsets of the TCAM entry may be set. In the example illustrated in FIG. 6, (a) represents a configuration of an offset of a TCAM entry when an offset range is set between 1001 and 1004, (b) represents a configuration of an offset of a TCAM entry when an offset range is set between 1005 and 1049, and (c) represents a configuration of an offset of a TCAM entry when an offset range is set between 1050 and 1499. In FIG. 6, a letter "x" denotes a "Don't Care" bit, e.g., a compare and bit. For example, when the nth bit of the TCAM entry is set as a "Don't Care" bit, the nth bit is regarded as matching regardless of a value of the nth bit of a search key.

Figure 7:
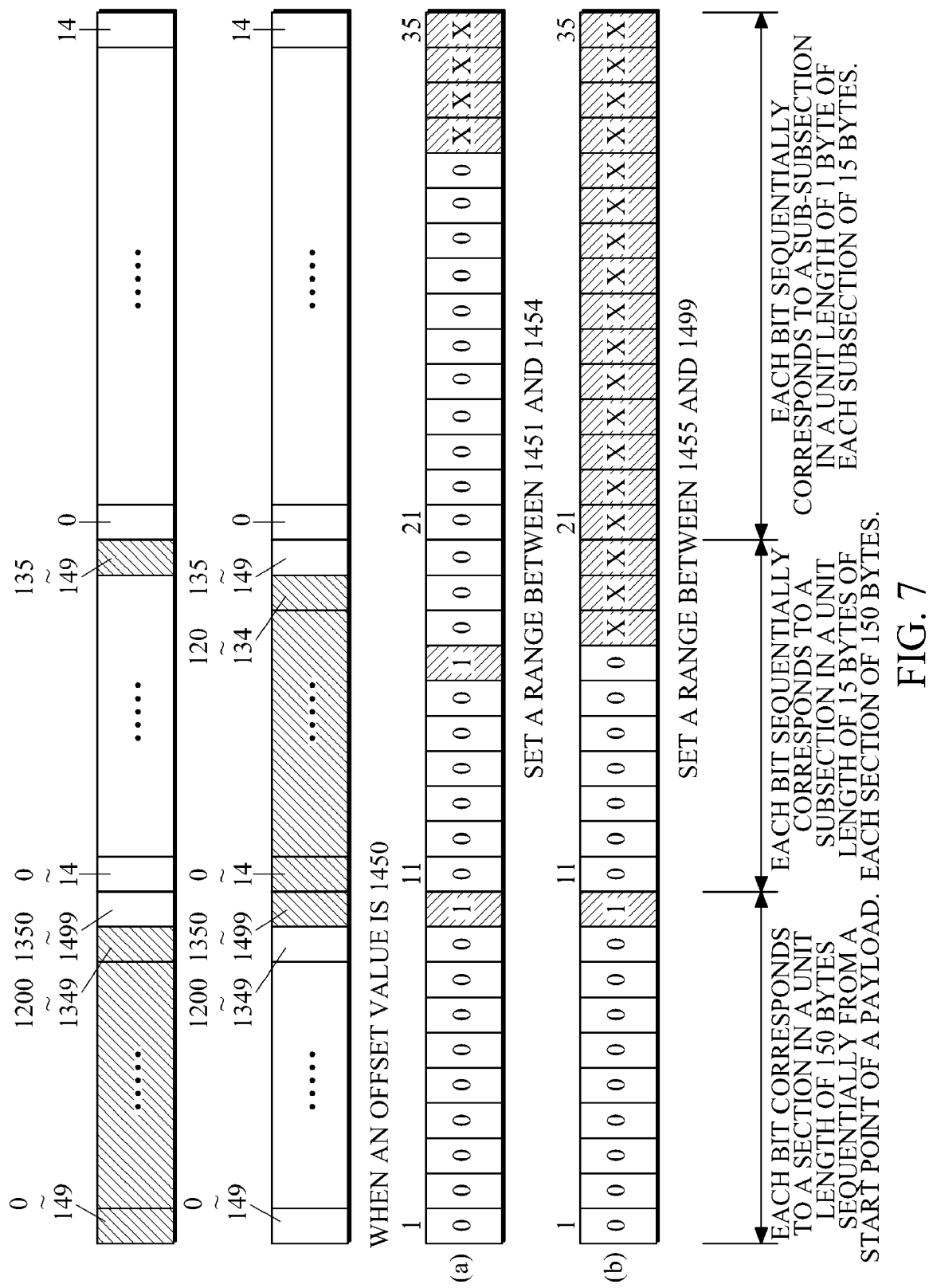
FIG. 7 is a diagram illustrating another example configuration of a TCAM entry when a signature is to be matched at a location behind a designated offset.

FIG. 7 illustrates another example configuration of a TCAM entry when a signature is to be matched at a location behind a designated offset. As shown in the example illustrated in FIG. 7, if an offset value is located between the sections corresponding to the first to the ninth bits and on the subsection corresponding to the twentieth bit, or if an offset value is located on the section corresponding to the tenth bit and between the subsections corresponding to the eleventh to the nineteenth bits, two TCAM entries are set. For example, if an offset value is 1450, two offsets of a TCAM entry are set. In the example illustrated in FIG. 7, (a) represents a configuration of an offset of a TCAM entry when an offset range is set between 1451 and 1454, and (b) represents a configuration of an offset of a TCAM entry when an offset range is set between 1455 and 1499.

Figure 8:
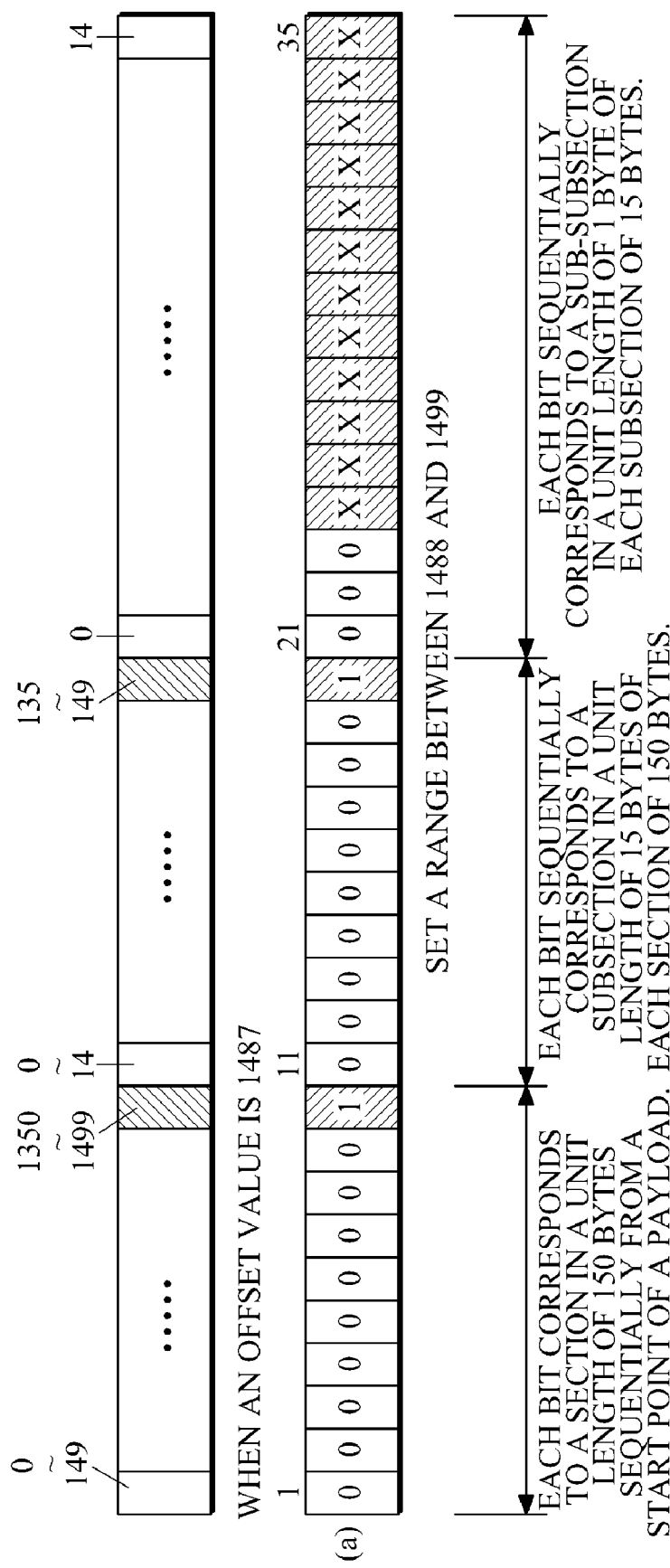
FIG. 8 is a diagram illustrating another example configuration of a TCAM entry when a signature is to be matched at a location behind a designated offset.

FIG. 8 illustrates another example configuration of a TCAM entry when a signature is to be matched at a location behind a designated offset. As shown in FIG. 8, if an offset value is located on the section corresponding to the tenth bit and on the subsection corresponding to the twentieth bit, one offset of a TCAM entry is set, as shown by (a). For example, if an offset value is 1487, one offset of a TCAM entry is set. In (a), an offset range is specified between 1488 and 1499.

When the signature is to be matched at a location behind the designated offset, between one and at most three TCAM entries may be set according to the offset value.

Figure 9:
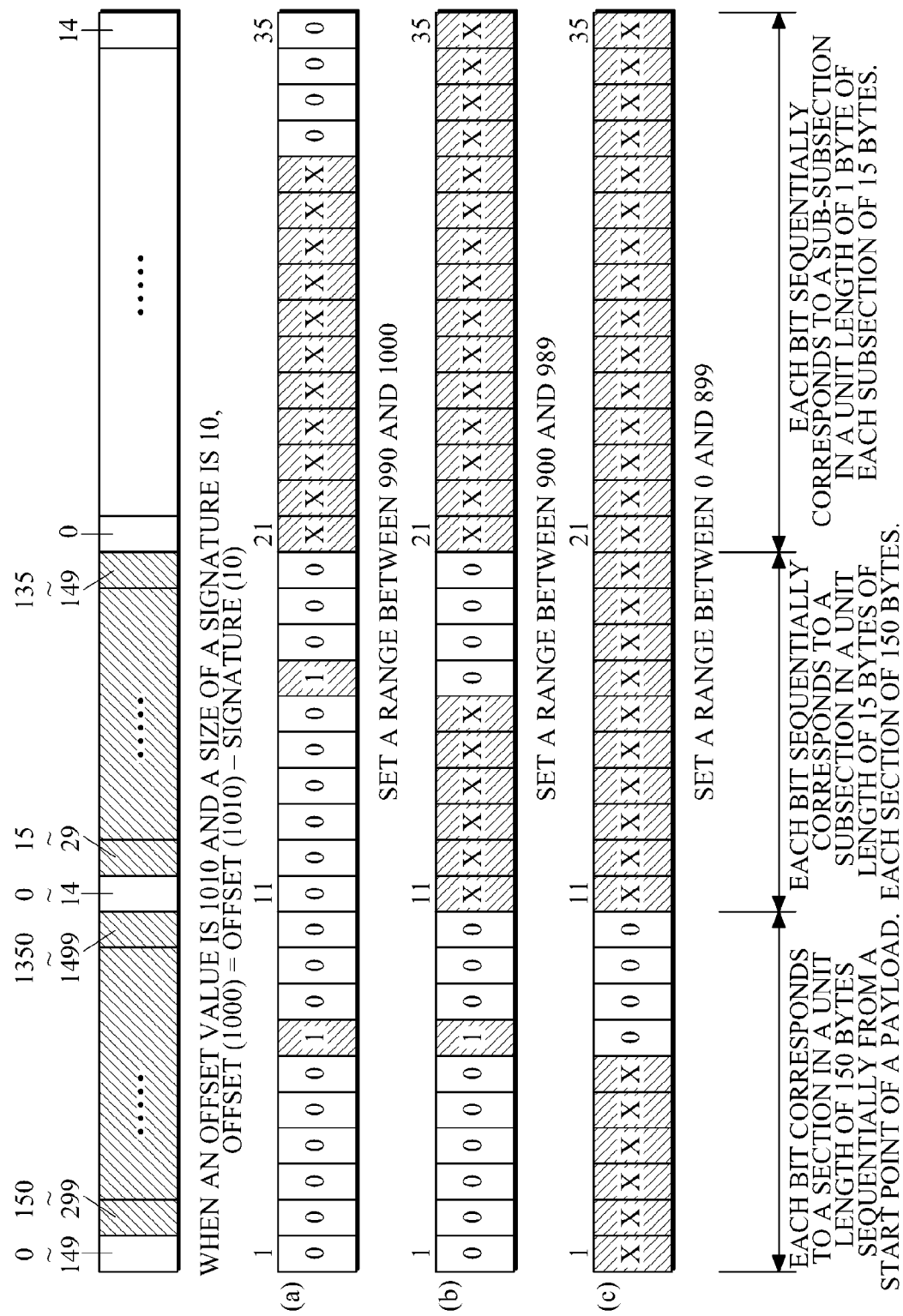
FIG. 9 is a diagram illustrating an example configuration of a TCAM entry when a signature is to be matched at a location ahead of a designated offset.

FIG. 9 illustrates an example configuration of a TCAM entry when a signature is to be matched at a location ahead of a designated offset. As shown in the example illustrated in FIG. 9, if an offset value is located between the sections corresponding to the second to the tenth bits and between the subsections corresponding to the twelfth to the twentieth bits, three TCAM entries are set. For example, if an offset value is 1010 and a size of the signature is 10, offset (1000)=offset (1010)−signature (10). In this case, offsets of the TCAM entry are as represented by (a), (b), and (c). In (a), an offset range is specified between 990 and 1000. In (b), an offset range is specified between 900 and 989. In (c), an offset range is specified between 0 and 899.

Figure 10:
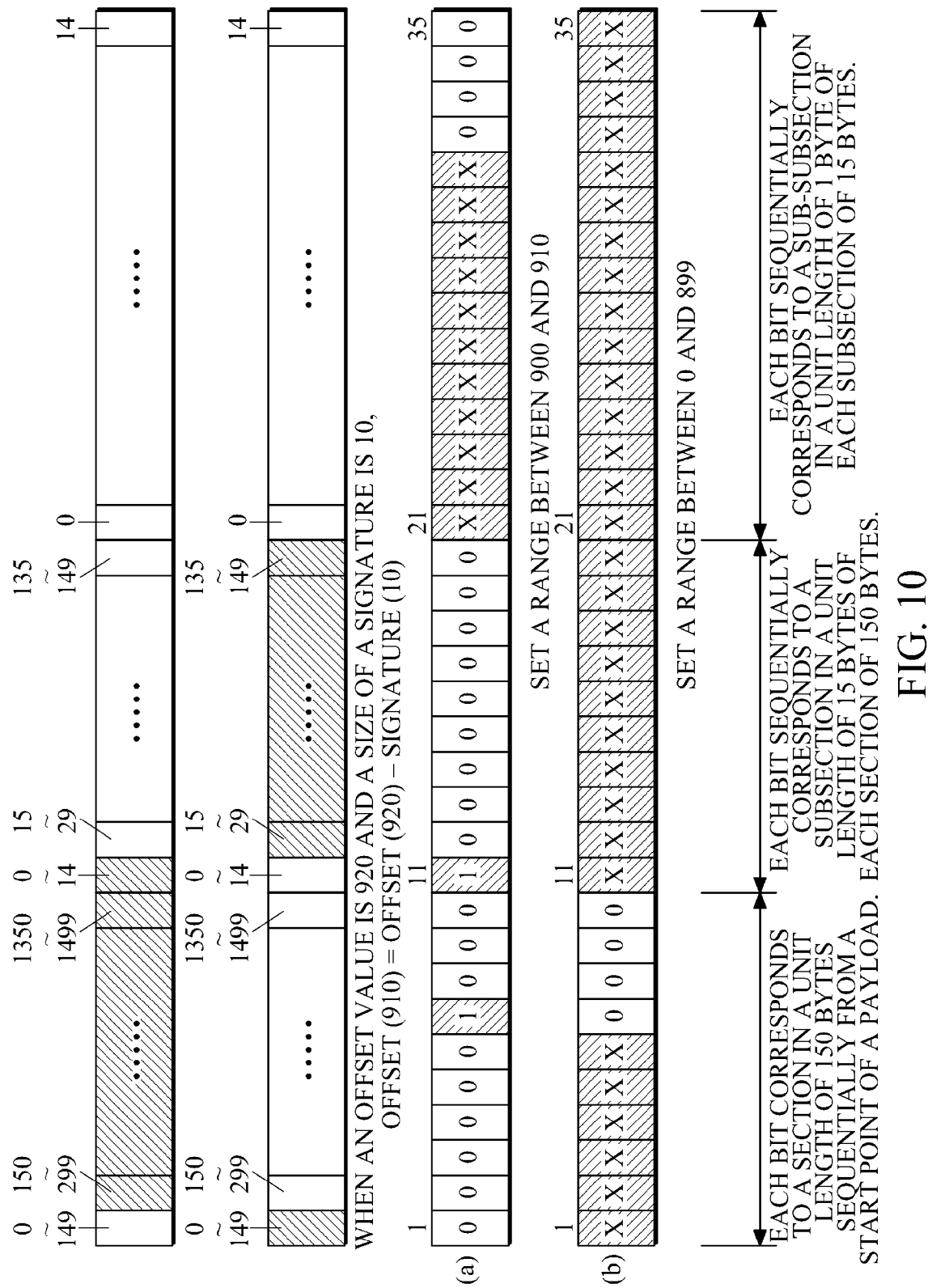
FIG. 10 is a diagram illustrating another example configuration of a TCAM entry when a signature is to be matched at a location ahead of a designated offset.

FIG. 10 illustrates another example configuration of a TCAM entry when a signature is to be matched at a location ahead of a designated offset. As shown in the example illustrated in FIG. 10, when an offset value is located between the sections corresponding to the second to the tenth bits and on the subsection corresponding to the eleventh bit, or when an offset value is located on the section corresponding to the first bit and between the subsections corresponding to is the twelfth to the twentieth bits, two TCAM entries are set. For example, when an offset value is 920 and a size of the signature is 10, offset (910)=offset (920)−signature (10). In this case, offsets of the TCAM entry may be as represented by (a) and (b) in FIG. 10. In (a), an offset range is specified between 900 and 910, and in (b), the offset range is specified between 0 and 899.

Figure 11:
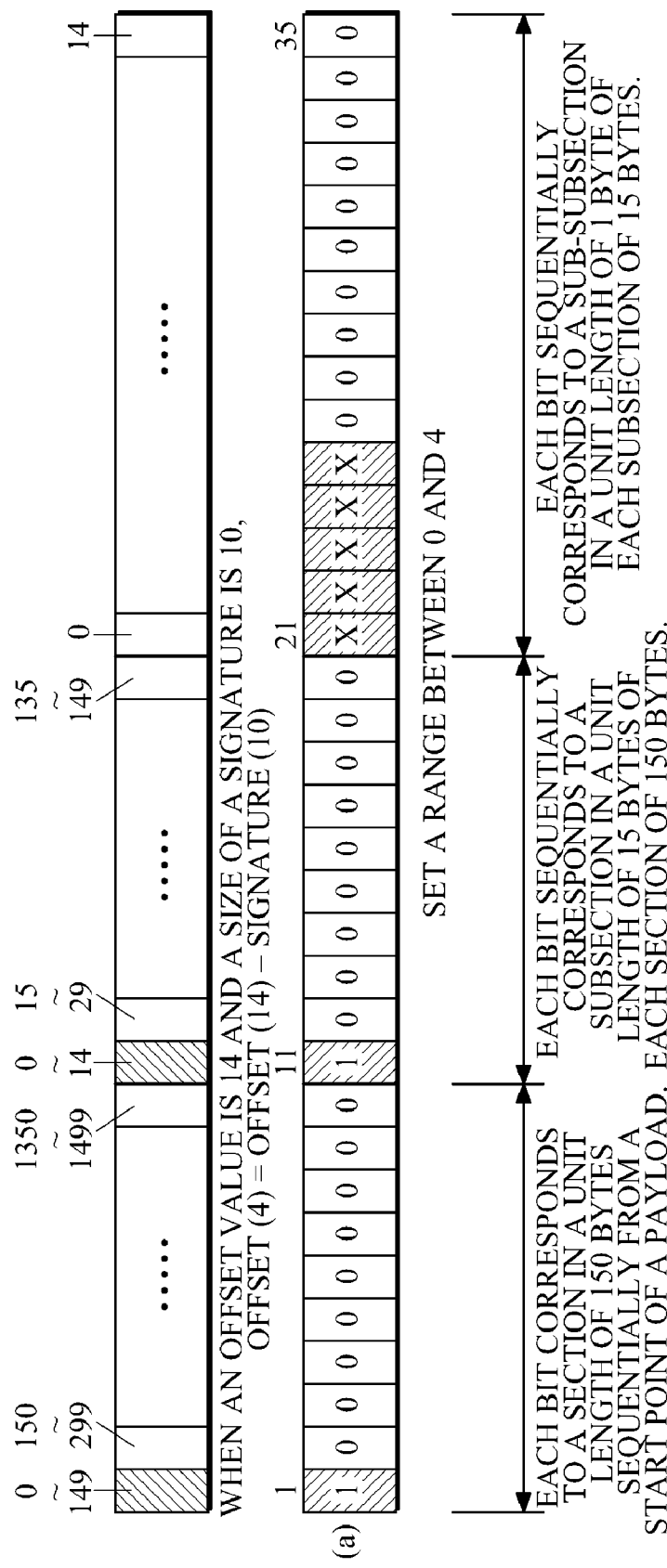
FIG. 11 is a diagram illustrating another example configuration of a TCAM entry when a signature is to be matched at a location ahead of a designated offset.

FIG. 11 illustrates another example configuration of a TCAM entry when a signature is to be matched at a location ahead of a designated offset. As shown in the example illustrated in FIG. 11, if an offset value is located on the section corresponding to the first bit and on the subsection corresponding to the eleventh bit, one TCAM entry is established. For example, if an offset value is 14 and a size of the signature is 10, offset (4)=offset (14)−signature (10). In this case, an offset of the TCAM entry may be as represented by (a) in FIG. 11. In (a), an offset range is specified between 0 and 4.

Figure 12:
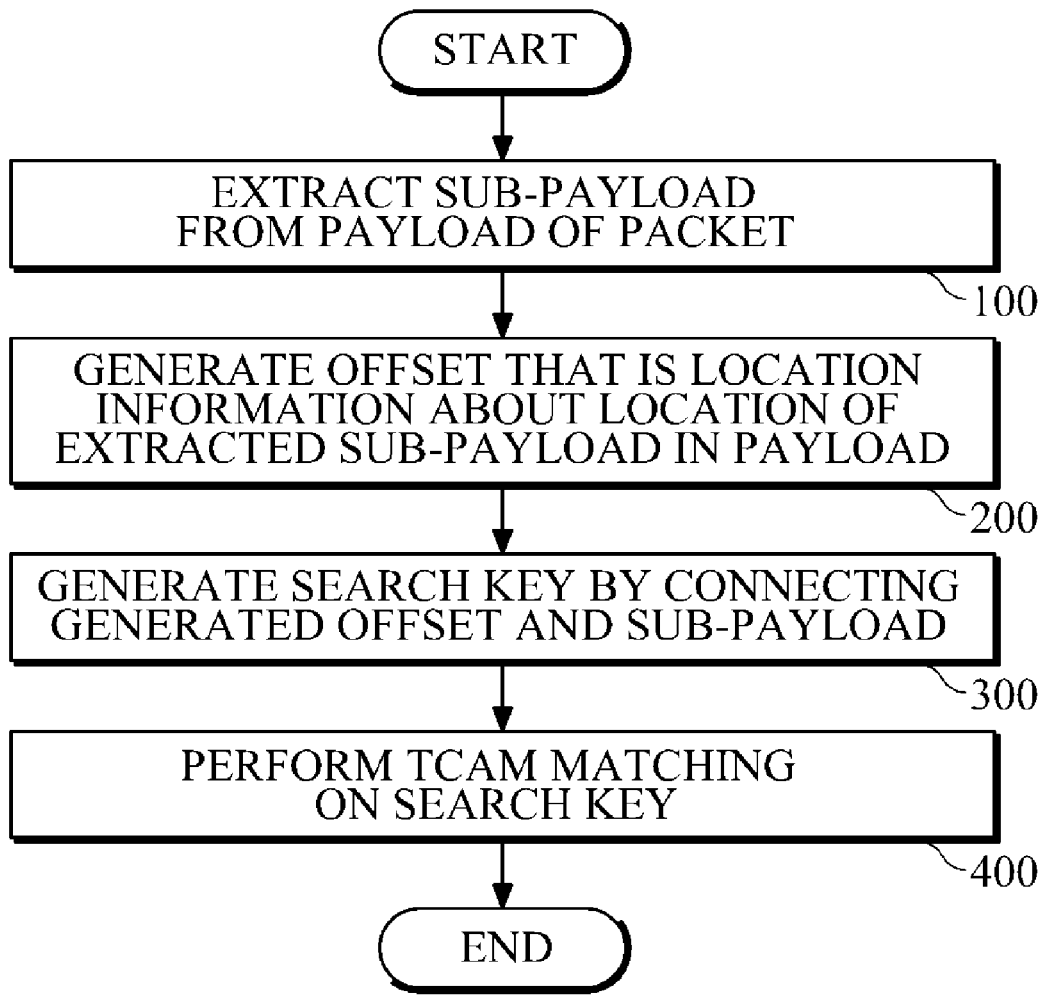
FIG. 12 is a flowchart illustrating a method of searching for a signature in a packet.

FIG. 12 is a flowchart illustrating a method of searching for a signature in a packet. Referring to FIG. 12, the process of searching for a signature in a packet is performed in a network device such as a router or a network security system such as a firewall, an intrusion prevention system, and an intrusion detection system. Hereinafter, it is assumed for convenience of explanation that a router performs the signature search process. A router receives a packet through a network line, and parses the received packet in accordance with predetermined procedures. Then, the router extracts a sub-payload of the same size as a signature from a payload of the packet for the signature search (100). Thereafter, an offset for the sub-payload is generated (200). The generated offset is connected to the sub-payload to generate a search key (300). The router performs TCAM matching on the generated search key (400).

A configuration of a TCAM entry which is to be compared with the search key during TCAM matching may be the same as the example illustrated in FIG. 4. The offsets of a TCAM may be set as illustrated in FIGS. 5 to 11 according to conditions where the signature is to be matched on a designated offset, where the signature is to be matched at a location behind a designated offset, and where the signature is to be matched at a location ahead of a designated offset.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of an apparatus searching for a signature in a packet, the method comprising:
    extracting a sub-payload to be compared with a signature from a payload packet;
    generating a search key that comprises the extracted sub-payload; and
    performing ternary content addressable memory (TCAM) matching to check if the generated search key matches a TCAM entry,
    wherein the TCAM entry comprises an offset that comprises a bit sequence, and the bit sequence of the offset is capable of being set according to the following conditions:
    where the bit sequence indicates that the signature is matched at a location of the offset in the payload of the packet,
    where the bit sequence indicates that the signature is matched at a location behind the offset in the payload of the packet, and
    where the bit sequence indicates that the signature is matched at a location ahead of the offset in the payload of the packet, and
    wherein the offset of the TCAM entry comprises a first bit group and at least one second bit group located behind the first bit group, the first bit group comprising a plurality of bits that correspond sequentially to sections of the payload, the sections being set by dividing the payload by a predetermined length, and the second bit group comprising a plurality of bits that correspond sequentially to subsections of each section corresponding to each bit of the first bit group, the subsections being set by dividing each section by a predetermined length smaller than the length used for dividing the section.

2. The method of claim 1, wherein the generating of the offset sets one bit belonging to each of the first bit group and the at least one second bit group as a valid bit.

3. The method of claim 1, wherein, in response to the signature being to be matched on a designated offset location, one bit included in each of the first bit group and the second bit group of the offset included in the TCAM entry is set as a valid bit.

4. The method of claim 1, wherein, in response to the signature being to be matched on a location behind or ahead of a designed offset, at least one of the bits belonging to the offset included in the TCAM entry is set as "Don't Care" bits.

5. An apparatus for searching for a signature in a packet, the apparatus comprising:
   an extractor configured to extract a sub-payload to be compared with a signature from a payload of a packet;
   an offset generator configured to generate an offset that comprises location information about a location of the sub-payload in the payload;
   a search key generator circuit configured to generate a search key that comprises the extracted sub-payload and the generated offset; and
   a performer configured to perform ternary content addressable memory (TCAM) matching to check if the generated search key matches a TCAM entry,
   where the bit sequence indicates that the signature is matched at a location of the offset in the payload of the packet,
   where the bit sequence indicates that the signature is matched at a location behind the offset in the payload of the packet, and
   where the bit sequence indicates that the signature is matched at a location ahead of the offset in the payload of the packet, and
   wherein the offset of the TCAM entry comprises a first bit group and at least one second bit group located behind the first bit group, the first bit group comprising a plurality of bits that correspond sequentially to sections of the payload, the sections being set by dividing the payload by a predetermined length, and the second bit group comprising a plurality of bits that correspond sequentially to subsections of each section corresponding to each bit of the first bit group, the subsections being set by dividing each section by a predetermined length smaller than the length used for dividing the section.

6. The apparatus of claim 5, wherein the offset generator is further configured to set one bit belonging to each of the first bit group and the at least one second bit group as a valid bit.

7. The apparatus of claim 5, wherein, in response to the signature being to be matched on a designated offset location, one bit included in each of the first bit group and the second bit group of the offset included in the TCAM entry is set as a valid bit.

8. The apparatus of claim 5, wherein, in response to the signature being to be matched on a location behind or ahead of a designated offset, at least one of the bits belonging to the offset included in the TCAM entry is set as "Don't Care" bits.

9. The apparatus of claim 5, wherein the bit sequence of the offset comprises a first bit group, a second bit group, and a third bit group, the first bit group dividing the payload of the packet into a plurality of sections, the second bit group dividing a respective section into a plurality of subsections, and the third bit group indicating a location of the offset in the respective subsection.

\* \* \* \* \*